United States Patent
Slavenburg et al.

(10) Patent No.: US 8,769,569 B1
(45) Date of Patent: *Jul. 1, 2014

(54) SYSTEM, METHOD, AND COMPUTER PROGRAM PRODUCT FOR TRANSCODING OR TRANSRATING VIDEO CONTENT FOR DELIVERY OVER A WIDE AREA NETWORK

(75) Inventors: Gerrit A. Slavenburg, Fremont, CA (US); Thomas F. Fox, Fremont, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/530,030

(22) Filed: Jun. 21, 2012

Related U.S. Application Data

(63) Continuation of application No. 11/468,220, filed on Aug. 29, 2006, now Pat. No. 8,276,180.

(51) Int. Cl.
*H04N 7/173* (2011.01)
*H04N 7/10* (2006.01)

(52) U.S. Cl.
USPC .......................................................... 725/36

(58) Field of Classification Search
None
See application file for complete search history.

(56) References Cited

U.S. PATENT DOCUMENTS

| | | | |
|---|---|---|---|
| 6,188,428 B1 * | 2/2001 | Koz et al. ........................ | 725/115 |
| 6,297,853 B1 * | 10/2001 | Sharir et al. ................... | 348/589 |
| 6,519,693 B1 * | 2/2003 | Debey ............................. | 712/201 |
| 6,760,916 B2 | 7/2004 | Holtz et al. | |
| 6,985,882 B1 * | 1/2006 | Del Sesto ........................ | 705/37 |
| 7,240,092 B2 * | 7/2007 | Houghton et al. ............. | 709/203 |
| 7,269,842 B1 * | 9/2007 | Estipona ........................ | 725/134 |
| 7,373,413 B1 * | 5/2008 | Nguyen et al. ................. | 709/231 |
| 7,500,258 B1 * | 3/2009 | Eldering ......................... | 725/32 |
| 2001/0049824 A1 * | 12/2001 | Baker et al. .................... | 725/109 |
| 2002/0026636 A1 * | 2/2002 | LeComte ......................... | 725/31 |
| 2002/0053078 A1 * | 5/2002 | Holtz et al. ..................... | 725/14 |
| 2002/0092019 A1 * | 7/2002 | Marcus ............................ | 725/37 |
| 2003/0005457 A1 * | 1/2003 | Faibish et al. .................. | 725/94 |
| 2003/0028896 A1 * | 2/2003 | Swart et al. .................... | 725/127 |
| 2003/0046704 A1 * | 3/2003 | Laksono et al. ................ | 725/96 |
| 2003/0074670 A1 | 4/2003 | Penk et al. | |
| 2004/0031058 A1 * | 2/2004 | Reisman ......................... | 725/112 |
| 2005/0172312 A1 * | 8/2005 | Lienhart et al. ................ | 725/19 |
| 2005/0188407 A1 * | 8/2005 | van Beek et al. .............. | 725/81 |
| 2005/0198686 A1 * | 9/2005 | Krause et al. .................. | 725/118 |
| 2005/0283791 A1 * | 12/2005 | McCarthy et al. ............. | 725/1 |
| 2006/0085815 A1 * | 4/2006 | Nguyen-Tran ................. | 725/34 |
| 2006/0095944 A1 * | 5/2006 | Demircin et al. ............... | 725/81 |
| 2006/0230176 A1 * | 10/2006 | Dacosta .......................... | 709/235 |
| 2007/0011709 A1 * | 1/2007 | Katz et al. ....................... | 725/87 |
| 2007/0101359 A1 * | 5/2007 | Schiller et al. ................. | 725/33 |
| 2007/0101378 A1 * | 5/2007 | Jacobs ............................ | 725/90 |
| 2007/0113258 A1 * | 5/2007 | Earle .............................. | 725/131 |
| 2007/0130581 A1 * | 6/2007 | Del Sesto et al. .............. | 725/36 |
| 2007/0130597 A1 * | 6/2007 | Parker et al. ................... | 725/94 |
| 2007/0130601 A1 * | 6/2007 | Li et al. .......................... | 725/112 |
| 2007/0157266 A1 * | 7/2007 | Ellis et al. ...................... | 725/89 |
| 2007/0162945 A1 * | 7/2007 | Mills .............................. | 725/119 |
| 2007/0245392 A1 * | 10/2007 | Shen ............................... | 725/115 |
| 2008/0022340 A1 * | 1/2008 | Hannuksela et al. .......... | 725/112 |

* cited by examiner

*Primary Examiner* — Brian T Pendleton
*Assistant Examiner* — Ryan Stronczer
(74) *Attorney, Agent, or Firm* — Zilka-Kotab, PC

(57) ABSTRACT

A system, method, and computer program product are provided for delivering video content over a wide area network (WAN). Included is at least one server for transcoding or transrating the video content for delivery over the WAN.

21 Claims, 4 Drawing Sheets

SYSTEM, METHOD, AND COMPUTER PROGRAM PRODUCT FOR TRANSCODING OR TRANSRATING VIDEO CONTENT FOR DELIVERY OVER A WIDE AREA NETWORK

RELATED APPLICATION(S)

This application is continuation of U.S. application Ser. No. 11/468,220, filed Aug. 29, 2006, which is incorporated herein by reference in its entirety.

FIELD OF THE INVENTION

The present invention relates to wide area network (WAN) communications, and more particularly to delivering video content over a WAN.

BACKGROUND

Many traditional television stations have expanded their services to provide regular broadcast programming via the Internet. Unfortunately, such service often exhibits poor video quality and is unreliable. For example, during periods of great demand (e.g. during football/soccer games, popular primetime shows, breaking news, etc.), the service may become overloaded, and frame drops or complete service interruptions may occur.

Prior art FIG. 1 illustrates a system 100 by which traditional television stations provide broadcast programming over a wide area network (WAN) such as the Internet. As shown, the system 100 includes a content source 102 (e.g. a studio, pre-recorded programming, etc.) that feeds an encoder 104 which, in turn, encodes video content for the purpose of broadcasting the same via a digital television transmitter 106.

In addition to the foregoing infrastructure, the system 100 further includes a plurality of computers 108, 110, 112, etc. adapted for receiving the aforementioned video content. However, instead of preparing the video content for traditional broadcasting, the computers 108, 110, 112 encode the video content for transmission over a WAN 114 (e.g. the Internet, etc.) to one or more clients 116.

Unfortunately, as the number of clients 116 grows, the computers 108, 110, 112 are unable to adequately support transmission of the video content over the WAN 114, particularly during the aforementioned periods of great demand. As mentioned before, this results in undesirable frame drops, complete service interruptions, etc. There is thus a need for overcoming these and/or other problems associated with the prior art.

SUMMARY

A system, method, and computer program product are provided for delivering video content over a wide area network (WAN). Included is at least one server for transcoding or transrating the video content for delivery over the WAN.

BRIEF DESCRIPTION OF THE DRAWINGS

Prior art

DETAILED DESCRIPTION

Figure 1:
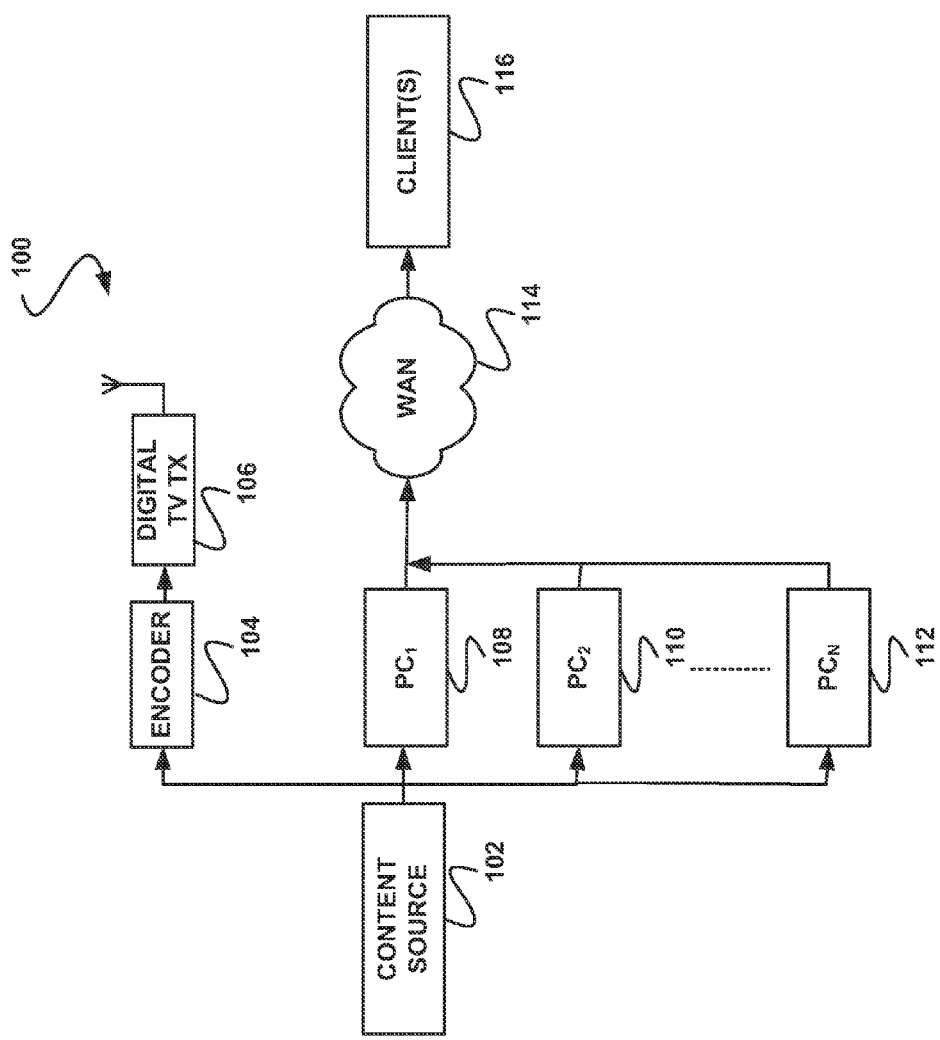
FIG. 1 illustrates a system by which traditional television stations provide broadcast programming over a wide area network (WAN) such as the Internet.
Figure 2:
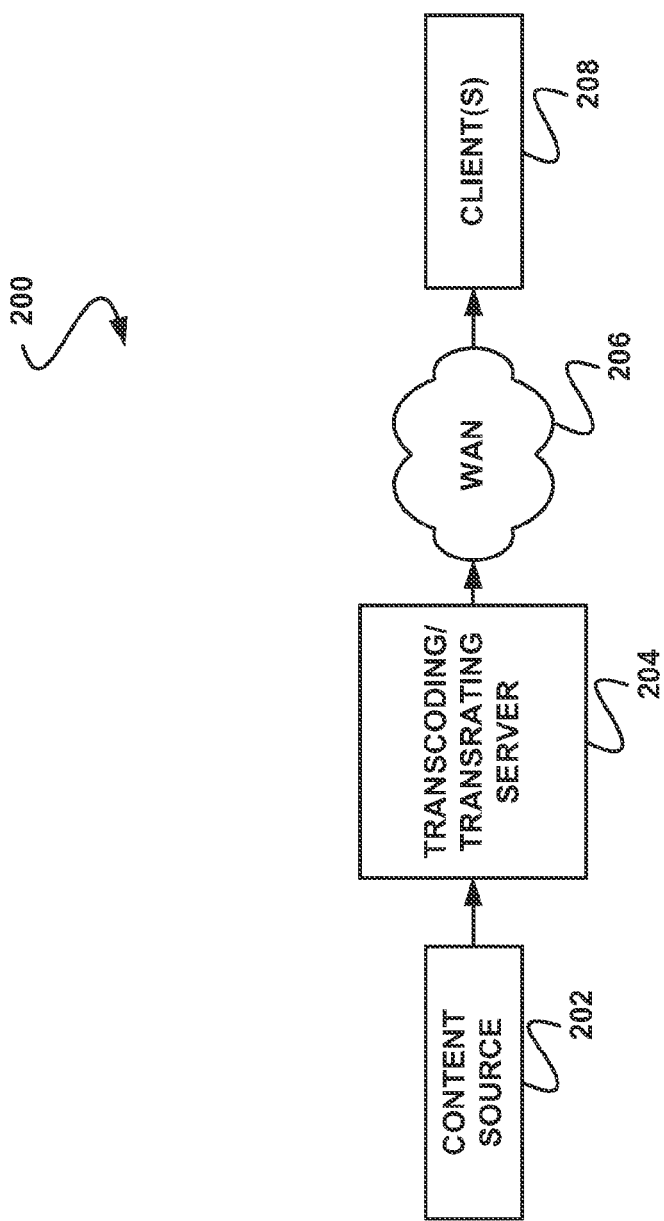
FIG. 2 shows a system for delivering video content over a WAN, in accordance with one embodiment.

FIG. 2 shows a system 200 for delivering video content over a wide area network (WAN), in accordance with one embodiment. As shown, the system 200 includes a content source 202. In various embodiments, the content source 202 may include a studio, a database of pre-recorded programming, a content server, and/or any other source of content, for that matter.

Further included is at least one server 204 for transcoding or transrating video content for delivery over a WAN 206 to one or more clients 208. Of course, the transcoding or transrating may be carried out by the server 204 by performing such processing using its own resources and/or resources under its control. For example, in one optional embodiment, such processing may be carried out utilizing specialized transcoding/transrating hardware, video acceleration hardware, any other hardware or software, etc.

In the context of the present description, the WAN 206 may include any one or more geographically dispersed networks. Just by way of example, such WAN 206 may include the Internet, in some embodiments. Of course, it is contemplated that the video content may or may not include audio content (or any other information, for that matter) as well.

In one embodiment, the transcoding may involve the conversion of the video content from a first format to a different second format. For example, in one optional embodiment, the content may be transcoded from a broadcast oriented format such as ATSC (HDTV signal), DVB-T or ISDB-T to a format more suitable for computer network distribution, such as mpeg4, WM9, H.264, etc. Of course, such lists of formats are set forth for illustrative purposes and should not be construed as limiting in any manner as any format may be utilized. Further, in some optional embodiments, the transcoding may involve the decoding of the first format, so that the video content may be re-encoded in the second format.

In other embodiments, the aforementioned transrating may refer to any conversion that changes a bandwidth required for the delivery of the video content, but does not necessarily require any decoding to accomplish the same. For example, in one embodiment, the transrating may include parsing the video content, removing at least a portion of high frequency components thereof, and then re-encoding the same. Of course, such example is set forth for illustrative purposes only, since any transrating may be employed that meets the above definition. It should be noted that the aforementioned server 204 may serve to transcode only, transrate only, or both transcode and transrate.

Further in the context of the present description, the server 204 may refer to any computer and/or processor. Also, the client(s) 208 may refer to a desktop computer, a lap-top computer, a personal digital assistant (PDA) device, a mobile phone device, a television, another server being served by the foregoing server 204, and/or any other device capable of receiving the video content for display or distribution purposes. While the server 204 is shown to be separate from the content source 202 in FIG. 2, it should be noted that they may or may not be integrated as a single component. Further, in an embodiment where they are separate, they may be separated by a network (e.g. the WAN 206, etc.).

To this end, a manner in which the video content is delivered to the client(s) 208 may be improved. More illustrative information will now be set forth regarding different embodiments including various optional architectures and features with which the foregoing framework may or may not be implemented, per the desires of the user.

For example, in various other performance-enhancing embodiments, one or more of aspects of the content delivery may be adaptively selected based on various factors (e.g. bandwidth, geographical location, historical information relating to delivery of previous video content, at least one aspect of at least one client receiving the video content, etc.). Still yet, various applications of the foregoing system 200 involving advertising, time-shifted video content, etc. may also be employed in still other embodiments.

It should be strongly noted that the following information is set forth for illustrative purposes and should not be construed as limiting in any manner. Any of the following features may be optionally incorporated with or without the exclusion of other features described.

Figure 3:
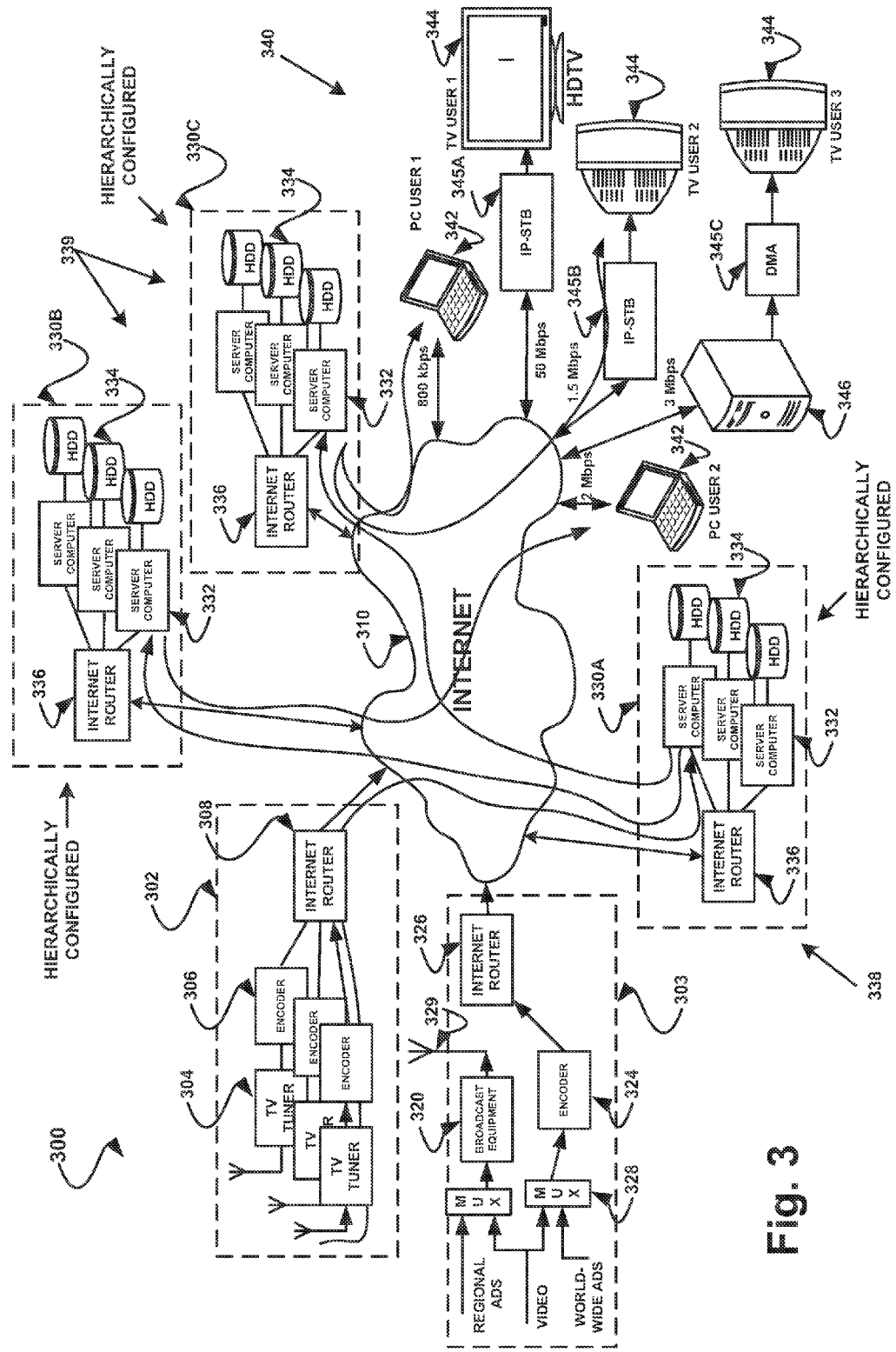
FIG. 3 shows a system for delivering video content over a WAN, in accordance with another embodiment.

FIG. 3 shows a system 300 for delivering video content over a WAN, in accordance with another embodiment. As an option, the present system 300 may be implemented in the context of the system 200 of FIG. 2. Of course, however, the system 300 may be used in any desired environment. Still yet, the above definitions apply during the following description.

As shown, a plurality of different types of content sources are provided including a first content source 302 and a second content source 303. As will soon become apparent, the first content source 302 receives broadcasted video content, thus using, as a content source, other remote content sources. Further, the second content source 303 may include the aforementioned studio or the like equipped for terrestrial transmission and Internet-based broadcasting.

The first content source 302 includes one or more television tuners 304 each adapted for receiving broadcasted video content (e.g. one or more locally available programs, etc.) from one or more broadcasters via a corresponding broadcast channel. Such received video content may, in turn, be encoded via an associated encoder 306 into a format appropriate for Internet transmission via an Internet router 308 which allows the multiple encoders 306 to share a high bandwidth connection to a WAN (e.g. Internet 310, etc.).

While multiple sets of tuners 304 and encoders 306 are shown in FIG. 3, it should be noted that an embodiment is contemplated where only a single tuner 304, and/or encoder 306 is provided. In still another optional aspect of such embodiment, one or more of such components may take the form of a SLINGBOX or the like. In still other embodiments, a simple camera (not shown) may be provided with an associated encoder 306 and/or router 308 for operating as yet another type of variant content source. In still additional embodiments, one or more encoder functions associated with the encoders 306 may be performed by a computer/server or any other mechanism, for that matter.

By this design, the first content source 302 may be positioned at a location where television programming of interest can be received and where a good connection to the Internet (e.g. multiple Mbit/sec/tuner, etc.) is available. For example, such location may include a networked corporate office, or in a special purpose location at a desired geographic site (e.g. U.K., India, China, etc.). To this end, a stream of digitally compressed video content may be sent to one more severs for transcoding/transrating purposes, in a manner that will soon become apparent.

For further reasons that will soon become apparent, video content available in an HDTV format may be transmitted in such original digital format without loss of quality (and without the need for encoding, etc.). Further, in other embodiments, video content available in a standard definition format may be encoded with a high quality encoder. In such embodiments, the HDTV formatted content may require an 18 Mbps connection, and the standard definition formatted content may require a 2-6 Mbps connection. Thus, an Internet connection with 100 Mbps upstream bandwidth may transmit as many as 4-5 HDTV formatted steams or 20-50 standard formatted streams, etc.

With attention now to the second content source 303, such source 303 is shown to include broadcast equipment 320 which may or may not be used in the context of a studio and/or pre-recorded programming for generating one or more channels of video content ready for broadcasting via a broadcast antenna 329. Similar to the first content source 302, the current source 303 feeds the video content to an associated encoder 324 for being encoded into a format appropriate for Internet transmission via an Internet router 326. In an embodiment where the second content source 303 broadcasts multiple channels, a set of the various components shown may be provided for each channel.

As an option, the broadcast video content may include advertising targeted towards a first (e.g. regional) audience reached by the broadcast antenna 329. In such embodiment, a multiplexer 328 or the like may allow insertion (into the Internet-based broadcast) of advertisements that target a second (e.g. worldwide) audience. The latter advertisements may include tourist advertising, advertisements for popular export goods, etc. To this end, at least one Internet-based advertisement may be delivered in addition to or instead of at least one other regional broadcast-based advertisement.

With continuing reference to FIG. 3, one or more server farms 330A, 330B, 330C are further provided. Each server farm 330A, 330B, 330C receives the video content from geographically dispersed content sources (e.g. see, for example, the first and second content sources 302, 303, etc.) via at least one server 332 for various processing (e.g. transcoding, transrating, etc.) and subsequent routing by way of an Internet router 336. As an option, the video content may be stored by the server(s) 332 utilizing at least one hard drive 334, for reasons that will be elaborated upon later.

In different embodiments, at least one of the server farms 330A may include an intermediate server farm adapted for only delivering the video content to other server farms 330B, 330C which, in turn, delivers the video content to an appropriate destination. Even still, at least one of the server farms may include a terminal server farm (not shown) adapted for only delivering the video content directly to the appropriate destination. Of course, it is contemplated that at least one of the server farms 330B, 330C may perform the functionality of both the intermediate and terminal server farms, in the form of a mixed use server farm.

Thus, the exemplary hierarchical configuration shown in FIG. 3 includes a single intermediate server farm 330A for receiving video content from the sources 302, 303 and distributing the same to a plurality of mixed use servers 330B, 330C. While such specific configuration is shown, it should not be construed as limiting in any way. For example, other configurations are contemplated with multiple layers of intermediate server farms, some of which are for mixed use, terminal in nature, etc.

A plurality of different clients 340 are further illustrated in FIG. 3. For example, a plurality of personal computer clients 342 are included. Such personal computer clients 342 may use predetermined software to view the video content. In one embodiment, a first one of the personal computer clients 342 may have an 800 kbps bandwidth network connection and therefore receive standard definition (SD) content with some loss of spatial resolution. In other embodiments, a second one of the personal computer clients 342 may have 2 Mbps bandwidth connection, allowing full sharpness SD content delivery.

Still yet, a plurality of television clients 344 are also included. Such television clients 344 may employ an IP-set top box (STB)-type device 345A, 345B or the like to view one or more channels of the video content. In other embodiments, a digital media adapter (DMA) 345C may be used to fulfill similar useful functions needed for Internet TV service. In various embodiments, the television clients 344 may obtain the video content in HDTV or SD format, subject to the available Internet bandwidth. Strictly as an option, one or more of the television clients 344 may employ a computer 346 for receiving the video content over the Internet 310, but then views and selects the content via the television client 344 utilizing a digital media adapter or the like.

In various embodiments, the personal computer clients 342 may first receive the video content in a window, and then switch to "full screen view," if desired. Further, the personal computer clients 342 may use a user interface (UI), including extensive keyboard/mouse input, to select and/or search various content sources. This may, in one embodiment, be referred to as a "2 foot UI." In contrast, the television clients 344 may use a remote control device to select content for viewing, without necessarily employing keyboard/mouse input (and hence with limited or no text input capability, etc.). Such television clients 344 may navigate a menu or program guide services to select the desired video content, or just "surf" channels. This may be referred to as a "10 foot UI." The system 300 may be used for either UI method or other UI methods, for that matter.

Figure 4:
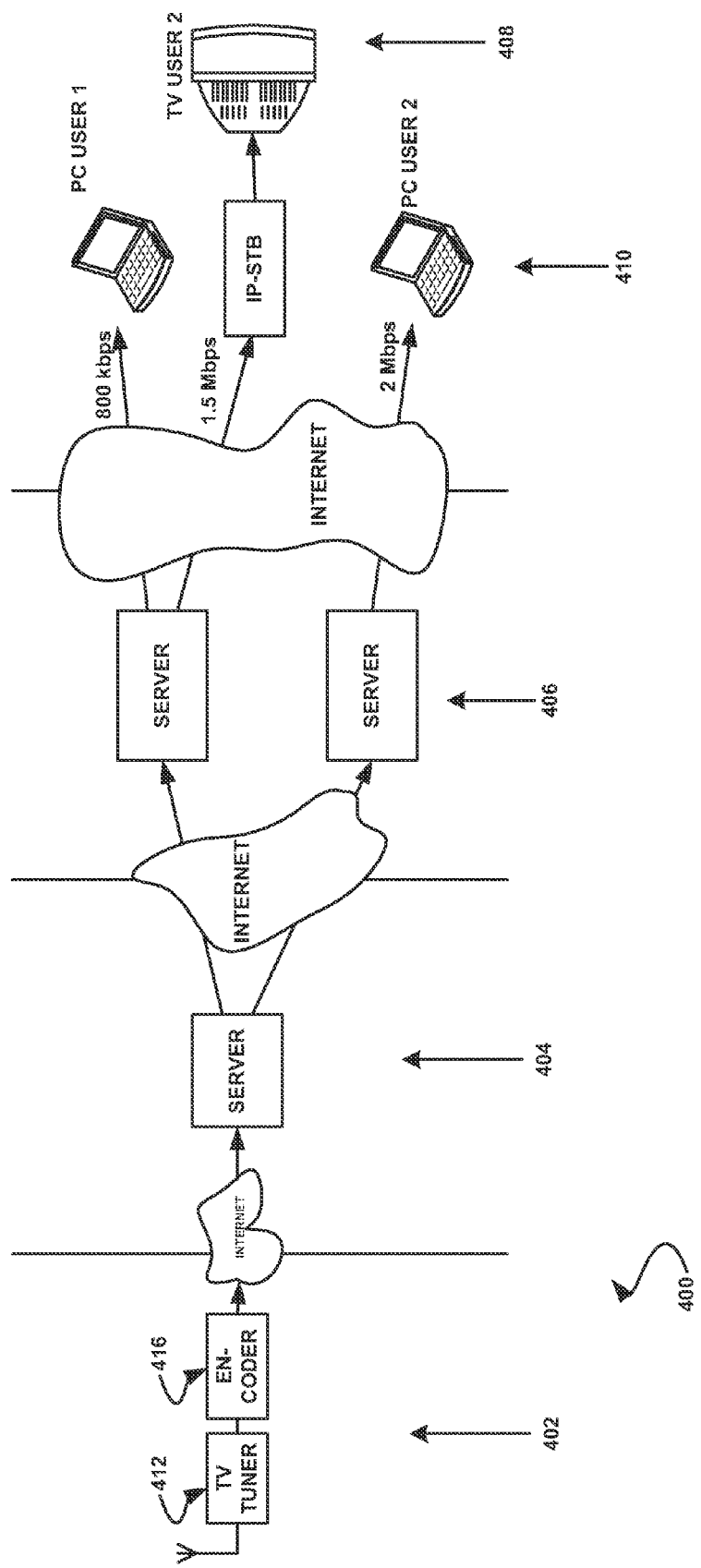
FIG. 4 shows an example of delivering video content over a WAN.

FIG. 4 shows an example 400 of delivering video content over a WAN. Specifically, the present example 400 may be carried out in the context of the system 300 of FIG. 3. Of course, however, the example 400 may be carried out in any desired environment. Again, the above definitions apply during the following description.

As shown, included in the present example 400 are a content source 402 (e.g. see the first content source 302 of FIG. 3, etc.), at least one intermediate server 404, at least one mixed use or terminal server 406, and at least one television client 408 and computer client 410. In use, a signal received by a tuner 412 of the content source 402 is first encoded into compressed digital video, utilizing an encoder 416. In a situation where the video content received by the tuner 412 is already digital, no encoding is necessary.

The encoded video content may then be sent to the intermediate server 404. In some embodiments where Internet bandwidth at the content source 402 is limited, the video content may be sent to a single intermediate server 404 which, in turn, forwards it to one or more mixed use or terminal servers 406. While not shown, additional layers of intermediate servers 404 may be provided to scale for more users. To this end, streams of video content may arrive at one or more terminal servers 406 from where they are sent to the appropriate client 408, 410

As mentioned earlier, various aspects of the system may be adaptable based on various factors. Specifically, any one or more of aspects of the delivery may be adaptively selected based on various factors (e.g. bandwidth, geographical location, historical information relating to delivery of previous video content, at least one aspect of at least one client receiving the video content, etc.).

Such aspects of the delivery may relate to which of a plurality differently formatted content copies to utilize for delivery of the content, which of a plurality geographically dispersed servers (and content thereof) to utilize for delivery of the content, a number of content copies to be made and where they are to be stored, whether to transcode/transrate or not, what type of transcode/transrate algorithm to use, how to divide video history across servers/disks of a particular content source, what advertisement content to deliver, and/or any other aspect of the delivery, for that matter.

To support one embodiment where differently formatted content copies are selected in a manner that will soon become apparent, several versions of the video content may be created by the intermediate server 404 by transcoding/transrating the same. For example, a video content in an HDTV format may be transcoded to a SD format. A SD format (or even HDTV format) may also be transcoded to an even more compact resolution format to serve clients with low Internet connection speed. It is also possible that an HDTV format (e.g. MPEG-2, etc.) may be transcoded to a more compact HDTV digital compression format, such as MPEG-4, AVC, etc.

Thus, in one exemplary adaptable embodiment, the system may address the fact that the clients 408, 410 may have dramatically different network bandwidth, ranging from a few hundred kbps to 100 Mbps. In such embodiment, the appropriate terminal server 406 may choose the appropriate version of video content available from the intermediate server 404. For instance, for clients with a high bit rate connection, the HDTV formatted version may be chosen. Further, for clients with a medium bit rate connection, the SD version may be utilized. Still yet, for users with a low bit rate connection (or with small screen resolution), a lowest resolution version may be chosen.

In additional embodiments, the terminal servers 406 may dynamically observe the effective bandwidth at which reliable communication with client 408, 410 is possible, and transrate the video content to exhibit a bit rate suitable for reliable delivery to that client 408, 410. To this end, a single terminal server 406 may serve multiple clients 408, 410 which each, in turn, receive a different bit rate, different resolution, and/or different video content.

In still additional embodiments, the video content may be time-shifted. For example, the video content may be stored (e.g. by any of the servers, for example), thus making the video content available after being broadcasted. In one embodiment, this may be accomplished by delaying the video content by a fixed amount to compensate for a difference in daylight time between source and a particular client. In other embodiments, this may be accomplished by allowing the client 408, 410 to view programs already transmitted within a predetermined amount of time (e.g. anything transmitted anywhere in the world within the last week, day, etc.). Of course, some broadcast content of a more permanent nature (e.g. movies, premium content, etc.) may be stored indefinitely for being made available on an on-demand basis. This feature may further allow for viewing at an appropriate time in light of a time zone in which the viewer is located, etc.

To accommodate the foregoing time-shifting or any other desired functionality, the storage of the video content may occur anywhere on the network, either close to the content source 402, the terminal server(s) 406, etc. Further, the location where a particular piece of video content is stored, and how many copies are stored may be adaptively selected based on expected behavior. Such expected behavior may, in turn, be based on historical information (e.g. collected regarding previously observed behavior, etc.). To this end, the video content may be available from an optimal number of optimally-located servers for facilitating an effective delivery of broadcast content.

In still another embodiment, a single copy of video content may be stored for each content source in an original format at a first intermediate server 404 where the content gets delivered. While this may be the most cost effective technique, hard disks on which the content is stored and/or the server to which such hard disks are attached may become a bottleneck, if many clients 408, 410 attempt to access the video content from such intermediate server 404.

To prevent such bottlenecking, each intermediate server 404 may be dimensioned to handle a required number of terminal servers 406. In some embodiments, the video content of the past week of a given content source may be distributed over multiple disks (e.g. 1 day back on server/disk A, 2-days back on server/disk B, etc.). This, in turn, distributes the traffic caused by the clients 408, 410 requesting a popular station over many disks without causing duplication of storage.

Thus, the decision as to where to store the video content, how many copies to store, and how to divide video history across servers/disks of a particular content source may be made based on expected traffic patterns and/or any other of the aforementioned factors, in order to minimize the probability of creating a bottleneck, while preventing excessive duplication.

As mentioned previously, a variety of applications may be employed utilizing the foregoing embodiments. For example, intelligent advertising may be employed, whereby one or more servers utilize information (e.g. location, profile, user input, etc.) about/from the client/user to tailor advertisement content for such client/user. Still yet, other embodiments are contemplated involving click-through advertising, etc. where interaction between the client/user and one or more servers may be tracked, logged, etc. and used for providing additional functionality (e.g. rewards, surveys, etc.).

By this functionality, various embodiments are therefore provided with a cost proportional to a number of simultaneously active users, and largely independent of an amount of video content. Such embodiments may be augmented by adding additional terminal and/or intermediate server farms, as required. By this design, television stations may be able to reach a worldwide audience without necessarily creating bottlenecks that may cause service drops in periods of great demand. These embodiments further allow many of such television stations to share equipment, reducing overall infrastructure cost. To this end, the embodiments may be scalable and used to create a worldwide television distribution system that is capable of transmitting SD and HDTV content from many or all television stations in the world to a multiplicity of worldwide users.

In different optional embodiments, the foregoing embodiments may be deployed in any desired manner. For example, a small scale service may be deployed using a single mixed use server in a trial metropolitan region. As a number of clients/users grow, more levels of intermediate servers and terminal serves may be added in locations with high bandwidth connectivity with respect to the region of clients/users that are served. If such intermediate/terminal services are placed close to large user communities, Internet traffic may thereby be partitioned such that no bottleneck exists, permitting a system to grow as large as desired. Graceful degradation thus may automatically occur in periods of peak demand, where adaptation to observed bandwidth automatically reduces bit rate and hence video spatial resolution, but frame drops or total loss of service may be avoided, in such embodiments.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
   at least one intermediate server for:
      receiving a plurality of portions of video content from a source over a predetermined period of time; and
      for each of the portions of the video content:
         determining a portion of the predetermined period of time during which the portion of the video content was received;
         selecting one of a plurality of additional servers according to the portion of the predetermined period of time during which the portion of the video content was received; and
         distributing the portion of the video content to the selected one of the additional servers;
   wherein each of the additional servers is associated with a different portion of the predetermined period of time, such that:
      a first one of the additional servers that is associated with a first portion of the predetermined period of time is selected for distributing thereto portions of the video content received during the first portion of the predetermined period of time, and
      a second one of the additional servers that is associated with a second portion of the predetermined period of time is selected for distributing thereto portions of the video content received during the second portion of the predetermined period of time.

2. The system as recited in claim 1, wherein the at least one intermediate server is one of a plurality of distributed servers in the wide area network.

3. The system as recited in claim 2, wherein the distributed servers are positioned at locations different from a location of the source of the video content.

4. The system as recited in claim 2, wherein the distributed servers include at least one first server for transcoding the video content.

5. The system as recited in claim 4, wherein the video content is transcoded into different formats.

6. The system as recited in claim 5, wherein the different formats include different resolutions.

7. The system as recited in claim 4, wherein a plurality of copies of the video content are stored each with a different format.

8. The system as recited in claim 5, wherein the at least one intermediate server delivers the video content in the different formats to the additional servers.

9. The system as recited in claim 8, wherein the least one first server, the at least one intermediate server, and the at least additional servers are hierarchically configured.

10. The system as recited in claim 8, wherein the additional servers deliver the video content to a client.

11. The system as recited in claim 9, wherein the additional servers select from the different formats for delivery of the video content to the client.

12. The system as recited in claim 11, wherein the additional servers transrate the video content for delivery to the client.

13. The system as recited in claim 1, wherein the video content includes video content received via a plurality of broadcast channels and transmitted to the at least one server for delivery over the wide area network.

14. The system as recited in claim 1, wherein the portion of the video content is distributed to the one of the additional servers selected according to the portion of the predetermined period of time during which the portion of the video content was received such that network traffic caused by multiple clients requesting the video content is distributed without causing duplication of storage.

15. The system as recited in claim 1, further comprising at least one server for transcoding or transrating the video content for delivery over a wide area network.

16. The system as recited in claim 15, wherein the at least one server is one of a plurality of distributed servers in the wide area network.

17. The system as recited in claim 16, wherein the at least one server that transcodes or transrates the video content is positioned at a location different from a location of the source of the video content.

18. The system as recited in claim 15, wherein the system operates such that the video content is time-shifted as a function of a time zone in which a client receiving the video content is located; and wherein the system operates such that at least one aspect of the delivery relates to what advertisement content to deliver based on a particular audience and transmission medium, such that a first advertisement is delivered with the video content for receipt by a regional audience via a broadcast, the first advertisement targeted towards the regional audience reached by a broadcast antenna, and a second advertisement is delivered with the video content instead of the first advertisement for receipt by a worldwide audience via the wide area network, the second advertisement targeted towards the worldwide audience reached by the wide area network.

19. A computer program product embodied on a computer readable medium, comprising:
  computer code for receiving a plurality of portions of video content from a source over a predetermined period of time; and
  for each of the portions of the video content, computer code for:
    determining a portion of the predetermined period of time during which the portion of the video content was received;
    selecting one of a plurality of additional servers according to the portion of the predetermined period of time during which the portion of the video content was received; and
    distributing the portion of the video content to the selected one of the additional servers;
  wherein each of the additional servers is associated with a different portion of the predetermined period of time, such that:
  a first one of the additional servers that is associated with a first portion of the predetermined period of time is selected for distributing thereto portions of the video content received during the first portion of the predetermined period of time, and
  a second one of the additional servers that is associated with a second portion of the predetermined period of time is selected for distributing thereto portions of the video content received during the second portion of the predetermined period of time.

20. A method, comprising
  receiving a plurality of portions of video content from a source over a predetermined period of time; and
  for each of the portions of the video content:
    determining a portion of the predetermined period of time during which the portion of the video content was received;
    selecting one of a plurality of additional servers according to the portion of the predetermined period of time during which the portion of the video content was received; and
    distributing the portion of the video content to the selected one of the additional servers;
  wherein each of the additional servers is associated with a different portion of the predetermined period of time, such that:
  a first one of the additional servers that is associated with a first portion of the predetermined period of time is selected for distributing thereto portions of the video content received during the first portion of the predetermined period of time, and
  a second one of the additional servers that is associated with a second portion of the predetermined period of time is selected for distributing thereto portions of the video content received during the second portion of the predetermined period of time.

21. The system as recited in claim 1, wherein the different portions of the video content received over a predetermined period of time from the source are distributed to different additional servers according to a portion of the predetermined period of time in which each of the portions of the video content were received from the source, to distribute network traffic caused by multiple clients requesting the video content without causing duplication of storage, by:
  identifying a first portion of the video content received over the first portion of the predetermined period of time from the source;
  delivering the identified first portion of the video content to the first one of the additional servers associated with the first portion of the predetermined period of time;
  identifying a second portion of the video content of the given source received over the second portion of the predetermined period of time from the source, the second portion of the predetermined period of time different from the first portion of the predetermined period of time; and
  delivering the identified second portion of the video content to the second one of the additional servers associated with the second portion of the predetermined period of time.

* * * * *